United States Patent
Moller et al.

(10) Patent No.: US 12,448,653 B2
(45) Date of Patent: *Oct. 21, 2025

(54) CIRCULATING SERUM MICRORNA BIOMARKERS AND METHODS FOR PARKINSON'S DISEASE PROGNOSIS

(71) Applicant: ST. JOHN'S UNIVERSITY, Queens, NY (US)

(72) Inventors: Simon Geir Moller, Queens, NY (US); Indranil Basak, Queens, NY (US); Ketan Patil, Queens, NY (US); Jan Petter Larsen, Queens, NY (US); Guido Werner Alves, Queens, NY (US)

(73) Assignee: ST. JOHN'S UNIVERSITY, Queens, NY (US)

(*) Notice: Subject to any disclaimer, the term of this patent is extended or adjusted under 35 U.S.C. 154(b) by 88 days.

This patent is subject to a terminal disclaimer.

(21) Appl. No.: 18/452,778

(22) Filed: Aug. 21, 2023

(65) Prior Publication Data

US 2024/0018595 A1 Jan. 18, 2024

Related U.S. Application Data

(62) Division of application No. 16/623,870, filed as application No. PCT/US2018/036380 on Jun. 7, 2018, now Pat. No. 11,739,384.

(60) Provisional application No. 62/521,797, filed on Jun. 19, 2017.

(51) Int. Cl.
C12Q 1/6883 (2018.01)

(52) U.S. Cl.
CPC ...... *C12Q 1/6883* (2013.01); *C12Q 2600/112* (2013.01); *C12Q 2600/158* (2013.01); *C12Q 2600/178* (2013.01)

(58) Field of Classification Search
CPC .................................. C12Q 2600/112
See application file for complete search history.

(56) References Cited

U.S. PATENT DOCUMENTS

| | | |
|---|---|---|
| 2013/0102485 A1 | 4/2013 | Lee |
| 2014/0235697 A1 | 8/2014 | Weiner |
| 2014/0322354 A1 | 10/2014 | Goel |
| 2015/0197809 A1 | 7/2015 | Myers |
| 2017/0145511 A1 | 5/2017 | Myers |
| 2017/0242041 A1 | 8/2017 | Wang et al. |
| 2019/0093167 A1* | 3/2019 | Umansky ............ A61P 25/28 |

FOREIGN PATENT DOCUMENTS

| | | |
|---|---|---|
| JP | 2013-504331 A | 2/2013 |
| WO | 2011/032155 A2 | 3/2011 |
| WO | 2014/018650 A1 | 1/2014 |
| WO | 2014/075822 A1 | 5/2014 |
| WO | 2015/073972 A1 | 5/2015 |
| WO | 2015/091892 A1 | 6/2015 |

OTHER PUBLICATIONS

Grasso et al. Molecules. 2014. 19:6891-6910. (Year: 2014).*
Marques et al. Mol Neurobiol. 2017. 54:7736-7745. (Year: 2017).*
Vallelunga et al. Frontiers in Cellular Neurosecience. 2014. 8:Article 156, 10 pages. (Year: 2014).*
Pinho et al. PLoS One. 2016. 11(6): e0157852, 19 pages. (Year: 2016).*
Khoo, Sok Kean, Circulating microRNAs as Progression Biomarkers for Parkinson's Disease, https://www.michaeljfox.org/foundation /grant-detail.php?grant_id=1388, Jan. 1, 2014, XP055497097.
Khoo, Sok Kean, Circulating MicroRNAs: a New Paradigm for Parkinson's Disease Biomarker Discovery, Parkinson's Disease, 10th Annual microRNA as Biomarkers and Diagnostics conference in Boston, Mar. 17-18, 2014; https://www.michaeljfox.org/foundation/gra nt-detail.php?grant_id=1096, Jun. 1, 2014, XP055497095.
Hoss, Andrew, The relationship of microRNAs to clinical features of Huntington's and Parkinson's disease, Jan. 1, 2016, XP093072023, https://open.bu.edu/bitstream/handle/2 144/14604/Hoss_bu_0017E_11703.pdf?sequence=17&isAllowed=y.
Hoss, Andrew, The relationship of microRNAs to clinical features of Huntington's and Parkinson's disease, Jan. 1, 2016, XP055509224, http:/www.google.com/url?sa=r&rct=j&q=&esrc=s&source=web &cd=9&ved=2ahUKEwjfgbWe3NPdAhWsM-wKHTRLB_gQFjAlegQIAhAC&url=https://open.bu.edu/bitstream/handle/2144/14604/Hoss_bu_0017E_429/Table%20S52.pdf?sequen ce 1&usg AOvVaw1l8-ZIJFKYVVJLM1u1e3KT.
Aarsland, et al. The Epidemiology of Dementia Associated with Parkinson Disease, Journal of the Neurological Sciences 289 (2010) 18-22.
Burgos et al., Profiles of Extracellular miRNA in Cerebrospinal Fluid and Serum from Patients with Alzheimer's and Parkinson's Diseases Correlate with Disease Status and Features of Pathology, PLoS One, 2014, vol. 9, Issue 5, p. 1-20.
Brashear, et al., ATP1A3-Related Neurologic Disorders, U.S. National Library of Medicine, GeneReviews, University of Washington (2008) 1-27.
Genetic and Rare Diseases Information Center, "Rapid-Onset Dystonia-Parkinsonism," pp. 1-9.
Hicks et al., Overlapping MicroRNA Expression in Saliva and Cerebrospinal Fluid Accurately Identifies Pediatric Traumatic Brain Injury, Journal of Neurotrauma, 2018, 35:64-72.
Hely, et al. The Sydney Multicenter Study of Parkinson's Disease: The Inevitability of Dementia at 20 years, Movement Disorders, vol. 23, No. 6, 2008, pp. 837-844.
Hoss et al., microRNA Profiles in Parkinson's Disease Prefrontal Cortex, frontiers in Aging Neuroscience, 2016. 8:36.
Table S2 from Hoss et al. Front Ageing Neurosci. 2016. 8:36.
Martinez, et al., MicroRNAs in blood and cerebrospinal fluid as diagnostic biomarkers of multiple sclerosis and to monitor disease progression, Neural Regeneration Research 2020, 15(4): pp. 606-619.
Patil, Ketan Shirish, Biomarkers and Target Discovery in Parkinson's Disease, Dissertation of Biological Sciences St. John's College of Liberal Arts and Sciences at St. John's University New York, ProQuest, Copyright 2016.

(Continued)

*Primary Examiner* — Joseph G. Dauner
(74) *Attorney, Agent, or Firm* — VENABLE LLP

(57) ABSTRACT

The invention provides biomarkers and methods for identifying, verifying and confirming circulating serum-based microRNAs. The microRNAs (PrognomiRs) can be used to differentiate patient's suffering from rapid progressing Parkinson's disease (PD) from slow progressing PD patients.

10 Claims, 1 Drawing Sheet
Specification includes a Sequence Listing.

(56) References Cited

OTHER PUBLICATIONS

Raoof et al., Cerebrospinal fluid microRNAs are potential biomarkers of temporal lobe epilepsy and status epilepticus, Scientific Reports, 2017, 7:2238.
Rosewich, et al., Research Conference Summary from the 2014 International Task Force on ATP1A3-Related Disorders, American Academy of Neurology (2017) 1-7.
Takousis et al., Differential expression of microRNAs in Alzheimer's disease brain, blood, and cerebrospinal fluid, Alzheimer's and Dementia, 2019, p. 1-10.
Tsiouris et al., Predicting Rapid Progression of Parkinson's Disease at Baseline Patients Evaluation, IEEE, 2017 pp. 3898-3901.
Tsiouris et al., Prognostic Factors of Rapid Symptoms Progression in Patients with Newly Diagnosed Parkinson's Disease, Artificial Intelligence in Medicine 103 (2020), pp. 1-15.
Weber et al., The MicroRNA Spectrum in 12 Body Fluids, Clin. Chem. 2010, p. 1-15.

* cited by examiner

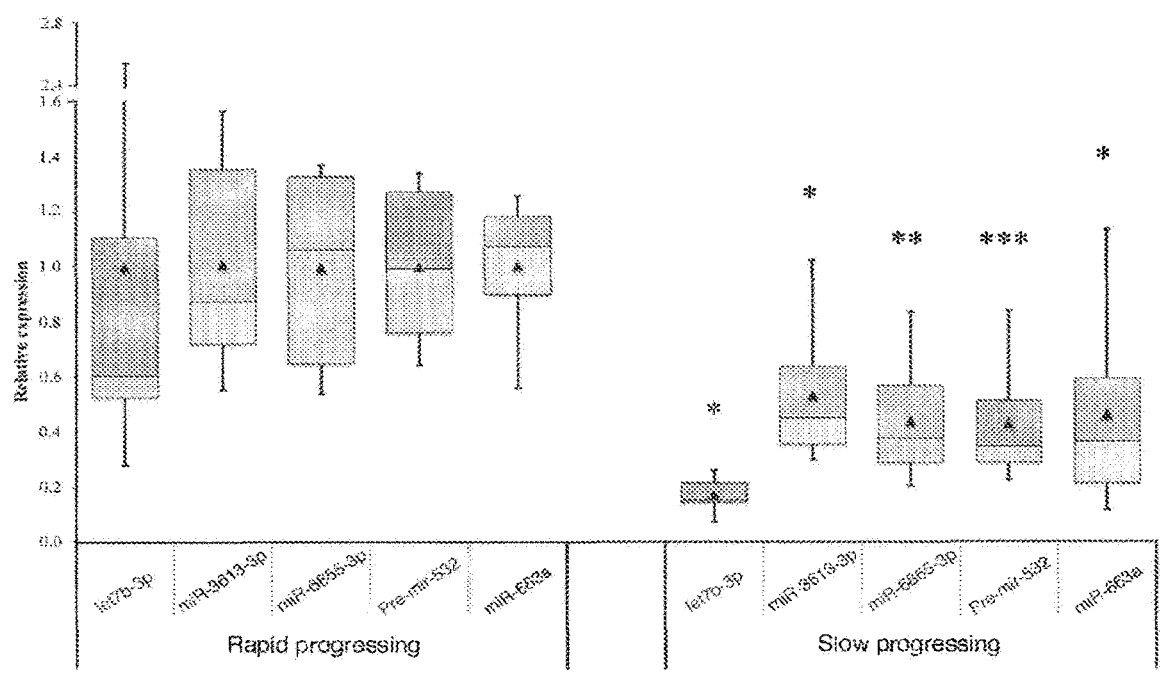

SEQUENCE LISTING

```
Sequence total quantity: 55
SEQ ID NO: 1            moltype = RNA   length = 22
FEATURE                 Location/Qualifiers
source                  1..22
                        mol_type = unassigned RNA
                        organism = Homo sapiens
SEQUENCE: 1
ctatacaacc tactgccttc cc                                              22

SEQ ID NO: 2            moltype = RNA   length = 79
FEATURE                 Location/Qualifiers
source                  1..79
                        mol_type = unassigned RNA
                        organism = Homo sapiens
SEQUENCE: 2
cccgggctga ggtaggaggt tgtatagttg aggaggacac ccaaggagat cactatacgg     60
cctcctagct ttccccagg                                                  79

SEQ ID NO: 3            moltype = RNA   length = 22
FEATURE                 Location/Qualifiers
source                  1..22
                        mol_type = unassigned RNA
                        organism = Homo sapiens
SEQUENCE: 3
cttggcacct agcaagcact ca                                              22

SEQ ID NO: 4            moltype = RNA   length = 22
FEATURE                 Location/Qualifiers
source                  1..22
```

```
                        mol_type = unassigned RNA
                        organism = Homo sapiens
SEQUENCE: 4
ccacctcccc tgcaaacgtc ca                                              22

SEQ ID NO: 5           moltype = RNA   length = 18
FEATURE                Location/Qualifiers
source                 1..18
                       mol_type = unassigned RNA
                       organism = Homo sapiens
SEQUENCE: 5
tccagtgccc tcctctcc                                                   18

SEQ ID NO: 6           moltype = RNA   length = 22
FEATURE                Location/Qualifiers
source                 1..22
                       mol_type = unassigned RNA
                       organism = Homo sapiens
SEQUENCE: 6
ttcctatgca tatacttctt tg                                              22

SEQ ID NO: 7           moltype = RNA   length = 21
FEATURE                Location/Qualifiers
source                 1..21
                       mol_type = unassigned RNA
                       organism = Homo sapiens
SEQUENCE: 7
tgttctcttt gccaaggaca g                                               21

SEQ ID NO: 8           moltype = RNA   length = 22
FEATURE                Location/Qualifiers
source                 1..22
                       mol_type = unassigned RNA
                       organism = Homo sapiens
SEQUENCE: 8
tcacagtggt ctctgggatt at                                              22

SEQ ID NO: 9           moltype = RNA   length = 66
FEATURE                Location/Qualifiers
source                 1..66
                       mol_type = unassigned RNA
                       organism = Homo sapiens
SEQUENCE: 9
ttcctctggc aagtaaaaaa ctctcatttt ccttaaaaaa tgagagtttt ttacttgcaa      60
taggaa                                                                66

SEQ ID NO: 10          moltype = RNA   length = 21
FEATURE                Location/Qualifiers
source                 1..21
                       mol_type = unassigned RNA
                       organism = Homo sapiens
SEQUENCE: 10
ctcccacttc cagatctttc t                                               21

SEQ ID NO: 11          moltype = RNA   length = 21
FEATURE                Location/Qualifiers
source                 1..21
                       mol_type = unassigned RNA
                       organism = Homo sapiens
SEQUENCE: 11
ttagtgaagg ctattttaat t                                               21

SEQ ID NO: 12          moltype = RNA   length = 24
FEATURE                Location/Qualifiers
source                 1..24
                       mol_type = unassigned RNA
                       organism = Homo sapiens
SEQUENCE: 12
acaaaaaaaa aagcccaacc cttc                                            24

SEQ ID NO: 13          moltype = RNA   length = 21
FEATURE                Location/Qualifiers
source                 1..21
                       mol_type = unassigned RNA
                       organism = Homo sapiens
SEQUENCE: 13
actgacagga gagcattttg a                                               21

SEQ ID NO: 14          moltype = RNA   length = 101
```

| FEATURE | Location/Qualifiers |
|---|---|
| source | 1..101<br>mol_type = unassigned RNA<br>organism = Homo sapiens |

SEQUENCE: 14
atatatatat atggaatgta tacggaat atatatatat atggaatgta tacggaat   60
atatatatat atggaatgta ttacggaata tatatatata t   101

| SEQ ID NO: 15 | moltype = RNA  length = 93 |
|---|---|
| FEATURE | Location/Qualifiers |
| source | 1..93<br>mol_type = unassigned RNA<br>organism = Homo sapiens |

SEQUENCE: 15
ggcgcttttg tgcgcgcccg ggtctgttgg tgctcagagt gtggtcaggc ggctcggact   60
gagcaggtgg gtgcggggct cggaggaggc ggc   93

| SEQ ID NO: 16 | moltype = RNA  length = 61 |
|---|---|
| FEATURE | Location/Qualifiers |
| source | 1..61<br>mol_type = unassigned RNA<br>organism = Homo sapiens |

SEQUENCE: 16
cacgtcctcc agcttttttc cttagtggcc aattcctgag aaaagggcca acgtgcttcc   60
a   61

| SEQ ID NO: 17 | moltype = RNA  length = 17 |
|---|---|
| FEATURE | Location/Qualifiers |
| source | 1..17<br>mol_type = unassigned RNA<br>organism = Homo sapiens |

SEQUENCE: 17
tggagagaaa ggcagta   17

| SEQ ID NO: 18 | moltype = RNA  length = 57 |
|---|---|
| FEATURE | Location/Qualifiers |
| source | 1..57<br>mol_type = unassigned RNA<br>organism = Homo sapiens |

SEQUENCE: 18
tggcgtctgg ggcctgaggc tgcagaacat tgcagcattc atgtcccacc cccacca   57

| SEQ ID NO: 19 | moltype = RNA  length = 94 |
|---|---|
| FEATURE | Location/Qualifiers |
| source | 1..94<br>mol_type = unassigned RNA<br>organism = Homo sapiens |

SEQUENCE: 19
tggtttgcga ctctgaaaac tagaaggttt atgactgggc atttctcacc caatgcccaa   60
tattgaactt tctagttgtc agagtcatta accc   94

| SEQ ID NO: 20 | moltype = RNA  length = 83 |
|---|---|
| FEATURE | Location/Qualifiers |
| source | 1..83<br>mol_type = unassigned RNA<br>organism = Homo sapiens |

SEQUENCE: 20
gggtttcctc tgccttttt tccaatgaaa ataacgaaac ctgttatttc ccattgaggg   60
ggaaaaaggc gggagaagcc cca   83

| SEQ ID NO: 21 | moltype = RNA  length = 73 |
|---|---|
| FEATURE | Location/Qualifiers |
| source | 1..73<br>mol_type = unassigned RNA<br>organism = Homo sapiens |

SEQUENCE: 21
actgtccttc agccagagct ggctgaaggg cagaagggaa ctgtccttca gccagagctg   60
gctgaagggc aga   73

| SEQ ID NO: 22 | moltype = RNA  length = 21 |
|---|---|
| FEATURE | Location/Qualifiers |
| source | 1..21<br>mol_type = unassigned RNA<br>organism = Homo sapiens |

SEQUENCE: 22
gcagtccatg ggcatataca c   21

| SEQ ID NO: 23 | moltype = RNA  length = 23 |
|---|---|
| FEATURE | Location/Qualifiers |

-continued

```
source                  1..23
                        mol_type = unassigned RNA
                        organism = Homo sapiens
SEQUENCE: 23
atacacatac acgcaacaca cat                                              23

SEQ ID NO: 24           moltype = RNA   length = 22
FEATURE                 Location/Qualifiers
source                  1..22
                        mol_type = unassigned RNA
                        organism = Homo sapiens
SEQUENCE: 24
tgaaactgga gcgcctggag ga                                               22

SEQ ID NO: 25           moltype = RNA   length = 83
FEATURE                 Location/Qualifiers
source                  1..83
                        mol_type = unassigned RNA
                        organism = Homo sapiens
SEQUENCE: 25
atatctacac aaggccaaag gaagagaaca gatatatcca cagtacactt ggctgttctc      60
tttctttagc cttgtgtaga tat                                              83

SEQ ID NO: 26           moltype = RNA   length = 21
FEATURE                 Location/Qualifiers
source                  1..21
                        mol_type = unassigned RNA
                        organism = Homo sapiens
SEQUENCE: 26
ggcgcgccca gctcccgggc t                                                21

SEQ ID NO: 27           moltype = RNA   length = 18
FEATURE                 Location/Qualifiers
source                  1..18
                        mol_type = unassigned RNA
                        organism = Homo sapiens
SEQUENCE: 27
tggatatgat gactgaaa                                                    18

SEQ ID NO: 28           moltype = RNA   length = 22
FEATURE                 Location/Qualifiers
source                  1..22
                        mol_type = unassigned RNA
                        organism = Homo sapiens
SEQUENCE: 28
caacctggag gactccatgc tg                                               22

SEQ ID NO: 29           moltype = RNA   length = 22
FEATURE                 Location/Qualifiers
source                  1..22
                        mol_type = unassigned RNA
                        organism = Homo sapiens
SEQUENCE: 29
ttttgtgtct cccattcccc ag                                               22

SEQ ID NO: 30           moltype = RNA   length = 85
FEATURE                 Location/Qualifiers
source                  1..85
                        mol_type = unassigned RNA
                        organism = Homo sapiens
SEQUENCE: 30
tctgaggtac ccggggcaga ttggtgtagg gtgcaaagcc tgcccgcccc ctaagccttc      60
tgcccccaac tccagcctgt cagga                                            85

SEQ ID NO: 31           moltype = RNA   length = 22
FEATURE                 Location/Qualifiers
source                  1..22
                        mol_type = unassigned RNA
                        organism = Homo sapiens
SEQUENCE: 31
aatcagtgaa tgccttgaac ct                                               22

SEQ ID NO: 32           moltype = RNA   length = 22
FEATURE                 Location/Qualifiers
source                  1..22
                        mol_type = unassigned RNA
                        organism = Homo sapiens
SEQUENCE: 32
tactcaggag agtggcaatc ac                                               22
```

```
SEQ ID NO: 33              moltype = RNA   length = 91
FEATURE                    Location/Qualifiers
source                     1..91
                           mol_type = unassigned RNA
                           organism = Homo sapiens
SEQUENCE: 33
cgacttgctt tctctcctcc atgccttgag tgtaggaccg ttggcatctt aattaccctc    60
ccacacccaa ggcttgcaga agagcgagcc t                                    91

SEQ ID NO: 34              moltype = RNA   length = 21
FEATURE                    Location/Qualifiers
source                     1..21
                           mol_type = unassigned RNA
                           organism = Homo sapiens
SEQUENCE: 34
taaaaactgc aattactttt a                                               21

SEQ ID NO: 35              moltype = RNA   length = 23
FEATURE                    Location/Qualifiers
source                     1..23
                           mol_type = unassigned RNA
                           organism = Homo sapiens
SEQUENCE: 35
caaagactgc aattactttt gcg                                             23

SEQ ID NO: 36              moltype = RNA   length = 79
FEATURE                    Location/Qualifiers
source                     1..79
                           mol_type = unassigned RNA
                           organism = Homo sapiens
SEQUENCE: 36
tgcatgagtt cgtcttggtc taggattgtt ggaggagtca gaaaaactac cccagggatc    60
ctgaagtcct ttgggtgga                                                  79

SEQ ID NO: 37              moltype = RNA   length = 67
FEATURE                    Location/Qualifiers
source                     1..67
                           mol_type = unassigned RNA
                           organism = Homo sapiens
SEQUENCE: 37
aaaatggtga gagcgttgag gggagttcca gacggagatg cgaggacccc tcggggtctg    60
acccaca                                                               67

SEQ ID NO: 38              moltype = RNA   length = 109
FEATURE                    Location/Qualifiers
source                     1..109
                           mol_type = unassigned RNA
                           organism = Homo sapiens
SEQUENCE: 38
aagaagcttg tagattttc tcccttacta tctagaatta taggacttca gtccatgatt    60
tggaaaaatt actggaattg gagtcaaaaa taatttgaaa attaggaat                109

SEQ ID NO: 39              moltype = RNA   length = 22
FEATURE                    Location/Qualifiers
source                     1..22
                           mol_type = unassigned RNA
                           organism = Homo sapiens
SEQUENCE: 39
atgctgacat atttactaga gg                                              22

SEQ ID NO: 40              moltype = RNA   length = 23
FEATURE                    Location/Qualifiers
source                     1..23
                           mol_type = unassigned RNA
                           organism = Homo sapiens
SEQUENCE: 40
acttgggcac tgaaacaatg tcc                                             23

SEQ ID NO: 41              moltype = RNA   length = 23
FEATURE                    Location/Qualifiers
source                     1..23
                           mol_type = unassigned RNA
                           organism = Homo sapiens
SEQUENCE: 41
tgtgcttgct cgtcccgccc gca                                             23

SEQ ID NO: 42              moltype = RNA   length = 22
FEATURE                    Location/Qualifiers
```

```
source                    1..22
                          mol_type = unassigned RNA
                          organism = Homo sapiens
SEQUENCE: 42
aggcggggcg ccgcgggacc gc                                              22

SEQ ID NO: 43             moltype = RNA   length = 22
FEATURE                   Location/Qualifiers
source                    1..22
                          mol_type = unassigned RNA
                          organism = Homo sapiens
SEQUENCE: 43
cctgacaccc catctgccct ca                                              22

SEQ ID NO: 44             moltype = RNA   length = 23
FEATURE                   Location/Qualifiers
source                    1..23
                          mol_type = unassigned RNA
                          organism = Homo sapiens
SEQUENCE: 44
cacacaggaa aagcggggcc ctg                                             23

SEQ ID NO: 45             moltype = RNA   length = 21
FEATURE                   Location/Qualifiers
source                    1..21
                          mol_type = unassigned RNA
                          organism = Homo sapiens
SEQUENCE: 45
acaccctctt tccctaccgc c                                               21

SEQ ID NO: 46             moltype = RNA   length = 24
FEATURE                   Location/Qualifiers
source                    1..24
                          mol_type = unassigned RNA
                          organism = Homo sapiens
SEQUENCE: 46
aggaggatgg agagctgggc caga                                            24

SEQ ID NO: 47             moltype = RNA   length = 83
FEATURE                   Location/Qualifiers
source                    1..83
                          mol_type = unassigned RNA
                          organism = Homo sapiens
SEQUENCE: 47
ggcccggctc cgggtctcgg cccgtacagt ccggccggcc atgctggcgg ggctggggcc     60
ggggccgagc cgcggcggg gcc                                              83

SEQ ID NO: 48             moltype = RNA   length = 22
FEATURE                   Location/Qualifiers
source                    1..22
                          mol_type = unassigned RNA
                          organism = Homo sapiens
SEQUENCE: 48
cgggactgta gagggcatga gc                                              22

SEQ ID NO: 49             moltype = RNA   length = 80
FEATURE                   Location/Qualifiers
source                    1..80
                          mol_type = unassigned RNA
                          organism = Homo sapiens
SEQUENCE: 49
gcgtcaagat ggcggcgggg aggtaggcag agcaggacgc cgctgctgcc gccgccaccg     60
ccgcctccgc tccagtcgcc                                                 80

SEQ ID NO: 50             moltype = RNA   length = 24
FEATURE                   Location/Qualifiers
source                    1..24
                          mol_type = unassigned RNA
                          organism = Homo sapiens
SEQUENCE: 50
tgctgatggc agatgtcggg tctg                                            24

SEQ ID NO: 51             moltype = RNA   length = 22
FEATURE                   Location/Qualifiers
source                    1..22
                          mol_type = unassigned RNA
                          organism = Homo sapiens
SEQUENCE: 51
tattgcactc gtcccggcct cc                                              22
```

```
SEQ ID NO: 52          moltype = RNA  length = 20
FEATURE                Location/Qualifiers
source                 1..20
                       mol_type = unassigned RNA
                       organism = Homo sapiens
SEQUENCE: 52
gtgagtcagg gtggggctgg                                                   20

SEQ ID NO: 53          moltype = RNA  length = 22
FEATURE                Location/Qualifiers
source                 1..22
                       mol_type = unassigned RNA
                       organism = Caenorhabditis elegans
SEQUENCE: 53
tcaccgggtg taaatcagct tg                                                22

SEQ ID NO: 54          moltype = RNA  length = 69
FEATURE                Location/Qualifiers
source                 1..69
                       mol_type = unassigned RNA
                       organism = Homo sapiens
SEQUENCE: 54
agaggcttgg gccgccgagc tggacccgga ccggttttgg gtactgtact gggggcaggg       60
cagagaggg                                                               69

SEQ ID NO: 55          moltype = RNA  length = 106
FEATURE                Location/Qualifiers
source                 1..106
                       mol_type = unassigned RNA
                       organism = Homo sapiens
SEQUENCE: 55
gtgctcgctt cggcagcaca tatactaaaa ttggaacgat acagagaaga ttagcatggc       60
ccctgcgcaa ggatgacacg caaattcgtg aagcgttcca tatttt                      106
```

CIRCULATING SERUM MICRORNA BIOMARKERS AND METHODS FOR PARKINSON'S DISEASE PROGNOSIS

This application is a divisional of U.S. patent application Ser. No. 16/623,870 filed Dec. 18, 2019 which claims benefit of PCT Application No. PCT/US2018/036380 filed Jun. 7, 2018, which in turn claims benefit of U.S. Provisional Patent Application No. 62/521,797 filed Jun. 19, 2017, which are hereby incorporated by reference herein in their entirety.

The instant application contains a Sequence Listing which has been submitted electronically in XML file format and is hereby incorporated by reference in its entirety. Said XML copy, created on Aug. 16, 2023, is named 140415 583529 SL.xml and is 50,367 bytes in size.

BACKGROUND OF THE INVENTION

1. Field of the Invention

The present invention generally relates to serum-based microRNAs and methods for differentiating patients suffering from Parkinson's disease based on the rate of disease progression, as well as assisting clinicians to determine treatment protocols for such patients.

2. Brief Description of the Background Art

Parkinson's Disease (PD) is a highly specific degeneration of dopamine-containing cells of the substantia nigra of the midbrain, causing a dopamine deficiency in the striatum. PD currently affects about 10 million people world-wide. Effective management of a patient with PD is possible in the first 5-7 years of treatment, after which time a series of often debilitating complications, together referred to as Late Motor Fluctuations (LMF) occur. It is believed that treatment with levodopa ((−)-L-α-amino-beta-(3,4-dihydroxybenzene) propanoic acid), or L-dopa, the most effective antiparkinson drug, may facilitate or even promote the appearance of LMF. Dopamine agonists are employed as a treatment alternative, but they do not offer the same degree of symptomatic relief to patients as L-dopa does.

Symptomatic therapies improve signs and symptoms without affecting the underlying disease state. Levodopa increases dopamine concentration in the striatum, especially when its peripheral metabolism is inhibited by a peripheral decarboxylase inhibitor (PDI). Levodopa/PDI therapy is widely used for symptomatic therapy for Parkinson's disease, such as combinations with levodopa, with carbidopa ((−)-L-α-hydrazino-α-methyl-beta-(3,4-dihydroxybenzene) propanoic acid monohydrate), levodopa and controlled release carbidopa, levodopa and benserazide, levodopa plus controlled release benserazide (2-Amino-3-hydroxy-propionic acid N'-(2,3,4-trihydroxy-benzyl)-hydrazide).

Catechol-O-methyltransferase (COMT) inhibitors enhance levodopa treatment as they inhibit levodopa's metabolism, enhancing its bioavailability and thereby making more of the drug available in the synaptic cleft for a longer period of time. Examples of COMT inhibitors include tolcapone (3,4-dihydroxy-4'-methyl-5-nitrobenzophenone) and entacapone ((E)-2-cyano-3-(3,4-dihydroxy-5-nitrophenyl)-N,N-diethyl-2-propenamide).

Dopamine agonists provide symptomatic benefit by directly stimulating post-synaptic striatal dopamine receptors. Examples include bromocriptine ((5α)-2-Bromo-12'-hydroxy-2'-(1-methylethyl)-5'-(2-methylpropyl)erg-otaman-3',6',18-trione), pergolide (8B-[(Methylthio)methyl]-6-propylergoline), ropinirole (4-[2-(Dipropylamino)ethyl]-1,3-dihydro-2H-indol-2-one), pramipexole ((S)-4,5,6,7-Tetrahydro-$N^6$-propyl-2,6-benzothiazolediamine), lisuride (N'-[(8α)-9,10-didehydro-6-methylergolin-8-yl]-N,N-diethyl-urea), cabergoline ((8β)-N-[3-(Dimethylamino)propyl]-N-[(ethylamino)carbonyl]-6-(2-propenyl)ergoline-8-carboxamide), apomorphine ((6aR)-5,6,6a,7-Tetrahydro-6-methyl-4H-dibenzo[de,g]quinoline-10,11-diol), sumanirole (5-(methylamino)-5,6-dihydro-4H-imidazo {4,5,1-ij}quinolin-2(1H)-one), rotigotine ((−)(S)-5,6,7,8-tetrahydro-6-[propyl[2-(2-thienyl)ethyl]amino]-1-naphthol-), talipexole (5,6,7,8-Tetrahydro-6-(2-propenyl)-4H-thiazolo[4,5-d]azepin-2-amine), and dihydroergocriptine (ergotaman-3',6',18-trione,9,10-dihydro-12'-hydroxy-2'-methyl-5'-(phenylmethyl) (5' cc)). Dopamine agonists are effective as monotherapy early in the course of Parkinson's disease and as an adjunct to levodopa in more advanced stages. Unlike levodopa, dopamine agonists directly stimulate post-synaptic dopamine receptors. They do not undergo oxidative metabolism and are not thought to accelerate the disease process.

Amantidine (1-Aminotricyclo $(3,3,1,1^{3,7})$ decane) is an antiviral agent that was discovered by chance to have anti-Parkinsonian activity. Its mechanism of action in PD has not been established, but is believed to work by increasing dopamine release. Patients who receive amantidine either as monotherapy or in combination with levodopa show improvement in akinesia, rigidity and tremor.

Other medications used in the treatment of Parkinson's disease include MAO-B inhibitors. Inhibition of L-dopa metabolism through inactivation of the monoamino oxidase type B (MAO-B) is an effective means of enhancing the efficacy of both endogenous residual dopamine and that exogenously derived from its precursor, L-dopa. Selegiline (methyl-(1-methyl-2-phenyl-ethyl)-prop-2-ynyl-amine) is a MAO-B inhibitor. There is evidence that treatment with selegiline may slow down disease progression in PD by blocking formation of free radicals derived from the oxidative metabolism of dopamine. Other examples of MAO B inhibitors include lazabemide (N-(2-Aminoethyl)-5-chloro-2-pyridinecarboxamide), rasagiline (N-propargyl-1-(R)aminoindan and caroxazone (2-oxo-2H-1,3-benzoxazine-3 (4H)-acetamide).

It is imperative to diagnose individuals with PD at an early stage and it is also important to determine the prognosis of the disease to increase the efficacy of therapeutic agents. However, there are neither any objective tests nor established biomarkers for diagnosing PD. Moreover, the heterogeneity, subtypes and progression of the disease make it difficult to develop specific therapeutic candidates.

MicroRNAs ("miRNAs) are a class of non-coding RNAs that play key roles in the regulation of gene expression. miRNAs act at the post-transcriptional level and fine-tune the expression of as much as 30% of all mammalian protein-encoding genes. Mature miRNAs are short, single-stranded RNA molecules approximately 22 nucleotides in length. miRNAs may be encoded by multiple loci, and may be organized in tandemly co-transcribed clusters. miRNA genes are transcribed by RNA polymerase II as large primary transcripts (pri-microRNA) that are processed by a protein complex containing the RNase III enzyme Drosha, DGCR8 and other cofactors, to form an approximately 70 nucleotide precursor microRNA (pre-miRNA). (Cathew R W, Cell, 2009; Kim V N, Nat Rev Mol Cel Biol, 2009; Siomi H, Mol Cel, 2010; Bartel D P, Cell, 2004; Lee Y, Nature 2003; Han J, Genes Dev, 2004.) Pre-miRNA is transported to the cytoplasm by Exportin-5 where it is processed by DICER, a second RNase III enzyme, together with TRBP, PACT and Ago2 in the RNA Induced Silencing Complex resulting in miRNA duplexes (Kim V N, Nat Rev Mol Cel Biol, 2009; Gregory R I, Nature 2004; MAcRae I J, PNAS, 2008). The guide strands of miRNA duplexes separate and associate with Ago 2 for incorporation into a ribonuclear particle to form the RNA-induced silencing complex RISC that mediates gene silencing. The mechanisms of miRNA range from direct degradation or silencing of mRNA and repression of translation to post-transcriptional upregulations. (MacRae U, PNAS, 2008.)

The presence of miRNAs has been reported in body fluids including blood, cerebrospinal fluid (CSF), plasma, serum and saliva at detectable levels. The tissue-specificity of miRNAs suggests their vital and integral role in various physiological processes. The tissue-enrichment promises a new but less explored role as diagnostic biomarker and potential therapeutic target. Circulating miRNAs are understood to originate from passive leakage from damaged tissue as a result of cell lysis or apoptosis, active transport from cells via microvesicles, such as exosomes, or bound within RISC protein complexes (Etheridge et al, 2011). Exosome and osmotic pump-mediated delivery of small RNA molecules to the brain and CNS, respectively, provides a solution to overcoming the limitations of miRNA-based therapies (Alvarez-Erviti et al., 2011; Koval et al, 2013, Hum. Mol. Gen). miRNA has been demonstrated to be exceptionally stable and thus present as powerful candidates to be potential biomarkers (Chen et al, 2008; Grasso, 2014).

SUMMARY OF THE INVENTION

It is an object of the present invention to identify miRNAs relevant to patients suffering from Parkinson's disease.

It is another object of the present invention to provide methods for determining the rate of disease progression for patients suffering from Parkinson's disease.

It is another object of the present invention to determine the methods for determining treatment option based on the rate of progression of the disease for patients suffering from Parkinson's disease.

These objects and others are achieved by the present invention, which provides miRNA biomarkers that may be used singly, in pairs or in combination to determine patients suffering from Parkinson's disease.

BRIEF DESCRIPTION OF THE DRAWINGS

FIG. 1 shows the mean fold change of five PrognomiRNAs between rapid and slow progressing PD patients;

DETAILED DESCRIPTION OF THE INVENTION

Methods

Serum Samples Handling and Classification

All patients and controls participated in the Norwegian ParkWest project, which is an ongoing prospective population-based longitudinal cohort study investigating the incidence, neurobiology and prognosis of PD. The Norwegian ParkWest study is a prospective longitudinal multicenter cohort study of patients with incident Parkinson's disease (PD) from Western and Southern Norway. Between November 1st 2004 and 31st of August 2006 it was endeavored to recruit all new cases of Parkinson Disease within the study area. Since the start of the study 212 of 265 (80%) of these patients and their age-/sex-matched control group have been followed.

All possible efforts were undertaken to establish an unselected and population-representative cohort of patients with PD. Patients were included if they had provided serum at study entry and fulfilled diagnostic criteria for PD of the National Institute of Neurological Disorders and Stroke and UK Brain Bank at latest follow-up. Patients with secondary parkinsonism at study entry were excluded from this study. Control subjects were recruited from multiple sources, including friends, spouses, and public organizations for elderly and were included in this study if they had provided serum. All patients and controls were Caucasian. The participants of the study have been followed for over eight years to establish the rate of disease progression.

In this study of possible biomarkers for PD we applied a two-stage procedure. For the first discovery phase serum from 8 patients with rapid and 8 patients with slow progression of PD were selected at random. The remaining 164 patients with PD that were eligible for this study were selected for verification purposes.

Serum samples were collected at the same day as the clinical examinations and then stored frozen at −70 degrees Celsius until transported to the facilities in New York on dry ice.

Example 1: Analyses of Differentially Expressed Human miRNA by qPCR

RNA Isolation from Serum Samples and QC

After thawing on ice, twenty-four (sixteen PD samples) serum samples were spun down for 5 mins at 3000×g to remove debris. The supernatant was used to perform small RNA isolation using miRCURY RNA Isolation Kit—Biofluids (Exiqon, MA). Before RNA Isolation, the lysis buffer was spiked with 0.267 fmol/ul of spike-in control cel-miR-39-3p (Qiagen, CA). The remaining part of the RNA isolation was performed following manufacturer's protocol and the isolated RNA was quantified on a Nanodrop 2000 (Thermo Scientific, MA). The RNA was used for running Affymetrix v4 microRNA microarray chips and for subsequent cDNA synthesis and qPCR. RNA from 180 serum samples (from PD patients from ParkWest project) was isolated as described above, they were not quantified by Nanodrop, but the qPCR data resulting from these samples were normalized by a reference small RNA scaRNA17.

miRNA Microarray and Data Analysis

The isolated RNA from twenty-four patient serum samples were quantified and subjected to Affymetrix GeneChip® miRNA 4.0 Array by the Yale Center for Genome Analysis. The normalized .CEL files obtained from Affymetrix Expression Console software were imported into Partek Genomics Suite version 6.6 Copyright @ 2012 (Partek, MO) for analysis. The 'microRNA Expression Workflow' was employed to detect differentially expressed miRNAs employing ANOVA resulting in lists of miRNAs significantly ($p<0.05$) expressed between rapid and slow PD cohorts. The miRNAs detected were used for further qPCR verification.

Quantitative Polymerase Chain Reaction cDNA for miRNA specific qPCR was synthesized using qScript™ microRNA cDNA Synthesis kit (Quanta Biosciences, MD) following manufacturer's protocol and subsequent qPCRs were performed using miRNA specific forward primers (Table #) and PerfeCTa® Universal PCR primer (Quanta Biosciences, MD). scaRNA17 and U6 were used reference small RNAs for normalizing qPCR Cq values whereas cel-miR-39-3p was used as spike-in control. PerfeCTa® SYBR® GREEN SuperMix for IQ™ (Quanta Biosciences, MD) was used for all qPCRs in a MyiQ™ Single color Real-Time PCR Detection System (Bio-Rad, CA). Standard curve for cel-miR-39-3p was analyzed in MS Excel with $R^2=0.97882$ and PCR efficiency 92.96%. No Template Control (NTC) was implied wherever needed.

Differentially expressed human miRNAs in Parkinson's disease patients' serum samples from The Norwegian Park-West study were determined employing miRNA microarray. Provided below are the miRNAs with >1.2 fold differential expression.

52 Differentially Expressed Human Pre- and Mature miRNAs with >1.2 Fold Change hsa-miR-6865-3p, hsa-miR-663a, hsa-miR-92b-3p, hsa-miR-455-3p, hsa-miR-937-5p, hsa-let-7b-3p, hsa-miR-6730-3p, hsa-miR-5010-3p, hsa-miR-1825, hsa-mir-4487, hsa-miR-4783-5p, hsa-miR-2117, hsa-mir-5090, hsa-mir-4484, hsa-miR-5094, hsa-mir-611, hsa-miR-4738-3p, hsa-miR-6894-5p, hsa-mir-8072, hsa-mir-762, hsa-let-7e, hsa-miR-6768-5p, hsa-mir-3917, hsa-mir-3673, hsa-mir-4431, hsa-miR-216a-3p, hsa-miR-635, hsa-miR-490-3p, hsa-mir-601, hsa-miR-636, hsa-miR-466, hsa-miR-1271-5p, hsa-miR-548u, hsa-miR-3606-5p, hsa-miR-510-5p, hsa-miR-4306, hsa-mir-4753, hsa-mir-6128, hsa-mir-4251, hsa-miR-1306-5p, hsa-miR-8052, hsa-mir-4310, hsa-mir-3128, hsa-miR-628-5p, hsa-miR-3660, hsa-miR-3156-3p, hsa-miR-548aj-3p, hsa-miR-4791, hsa-mir-532, hsa-miR-202-5p, hsa-miR-3613-3p, hsa-miR-8075

36 Differentially Expressed Mature miRNAs with >1.2 Fold Change hsa-miR-6865-3p, hsa-miR-663a, hsa-miR-92b-3p, hsa-miR-455-3p, hsa-miR-937-5p, hsa-let-7b-3p, hsa-miR-6730-3p, hsa-miR-5010-3p, hsa-miR-1825, hsa-miR-4783-5p, hsa-miR-2117, hsa-miR-5094, hsa-miR-4738-3p, hsa-miR-6894-5p, hsa-let-7e, hsa-miR-6768-5p, hsa-miR-216a-3p, hsa-miR-635, hsa-miR-490-3p, hsa-miR-636, hsa-miR-466, hsa-miR-1271-5p, hsa-miR-548u, hsa-miR-3606-5p, hsa-miR-510-5p, hsa-miR-4306, hsa-miR-1306-5p, hsa-miR-8052, hsa-miR-628-5p, hsa-miR-3660, hsa-miR-3156-3p, hsa-miR-548aj-3p, hsa-miR-4791, hsa-miR-202-5p, hsa-miR-3613-3p. hsa-miR-8075

16 Differentially Expressed Premature miRNAs with >1.2 Fold Change hsa-mir-4487, hsa-mir-5090, hsa-mir-4484, hsa-mir-611, hsa-mir-8072, hsa-mir-762, hsa-mir-3917, hsa-mir-3673, hsa-mir-4431, hsa-mir-601, hsa-mir-4753, hsa-mir-6128, hsa-mir-4251, hsa-mir-4310, hsa-mir-3128, hsa-mir-532, These differentially expressed miRNA sequences are illustrated below in Table 1, along with the reference/house-keeping small RNAs cel-miR-39-3p, U6 and ScaRNA17 used as controls. Cel-miR-39-3p is a spike-in control that demonstrates the stability of the RNA samples. U6 and ScaRNA17 are used as internal controls to normalize the readings of the rest of the miRNAs or candidate miRNAs.

Example 1

TABLE 1

| microRNA/small RNA name | microRNA Sequence |
|---|---|
| hsa-let-7b-3p | CUAUACAACCUACUGCCUUCCC (SEQ ID NO: 1) |
| hsa-let-7e | CCCGGGCUGAGGUAGGAGGUUGUAUAGUUGAGGAGGACACCC AAGGAGAUCACUAUACGGCCUCCUAGCUUUCCCCAGG (SEQ ID NO: 2) |
| hsa-miR-1271-5p | CUUGGCACCUAGCAAGCACUCA (SEQ ID NO: 3) |
| hsa-miR-1306-5p | CCACCUCCCCUGCAAACGUCCA (SEQ ID NO: 4) |
| hsa-miR-1825 | UCCAGUGCCCUCCUCUCC (SEQ ID NO: 5) |
| hsa-miR-202-5p | UUCCUAUGCAUAUACUUCUUUG (SEQ ID NO: 6) |
| hsa-miR-2117 | UGUUCUCUUUGCCAAGGACAG (SEQ ID NO: 7) |
| hsa-miR-216a-3p | UCACAGUGGUCUCUGGGAUUAU (SEQ ID NO: 8) |
| hsa-mir-3128 | UUCCUCUGGCAAGUAAAAAACUCUCAUUUUCCUUAAAAAAUG AGAGUUUUUUACUUGCAAUAGGAA (SEQ ID NO: 9) |
| hsa-miR-3156-3p | CUCCCACUUCCAGAUCUUUCU (SEQ ID NO: 10) |
| hsa-miR-3606-5p | UUAGUGAAGGCUAUUUUAAUU (SEQ ID NO: 11) |
| hsa-miR-3613-3p | ACAAAAAAAAAGCCCAACCCUUC (SEQ ID NO: 12) |
| hsa-miR-3660 | ACUGACAGGAGAGCAUUUUGA (SEQ ID NO: 13) |
| hsa-mir-3673 | AUAUAUAUAUAUGGAAUGUAUAUACGGAAUAUAUAUAUAUA UGGAAUGUAUAUACGGAAUAUAUAUAUAUAUGGAAUGUAUU ACGGAAUAUAUAUAUAU AU (SEQ ID NO: 14) |
| hsa-mir-3917 | GGCGCUUUUGUGCGCGCCCGGGUCUGUUGGUGCUCAGAGUGU GGUCAGGCGGCUCGGACUGAGCAGGUGGGUGCGGGGCUCGGA GGAGGCGGC (SEQ ID NO: 15) |

TABLE 1-continued

| microRNA/small RNA name | microRNA Sequence |
|---|---|
| hsa-mir-4251 | CACGUCCUCCAGCUUUUUUCCUUAGUGGCCAAUUCCUGAGAA AAGGGCCAACGUGCUUCCA (SEQ ID NO: 16) |
| hsa-miR-4306 | UGGAGAGAAAGGCAGUA (SEQ ID NO: 17) |
| hsa-mir-4310 | UGGCGUCUGGGGCCUGAGGCUGCAGAACAUUGCAGCAUUCAU GUCCCACCCCCACCA (SEQ ID NO: 18) |
| hsa-mir-4431 | UGGUUUGCGACUCUGAAAACUAGAAGGUUUAUGACUGGGCA UUUCUCACCCAAUGCCCAAUAUUGAACUUUCUAGUUGUCAGA GUCAUUAACCC (SEQ ID NO: 19) |
| hsa-mir-4484 | GGGUUUCCUCUGCCUUUUUUUCCAAUGAAAAUAACGAAACCU GUUAUUUCCAUUGAGGGGGAAAAAGGCGGGAGAAGCCCCA (SEQ ID NO: 20) |
| hsa-mir-4487 | ACUGUCCUUCAGCCAGAGCUGGCUGAAGGGCAGAAGGGAACU GUCCUUCAGCCAGAGCUGGCUGAAGGGCAGA (SEQ ID NO: 21) |
| hsa-miR-455-3p | GCAGUCCAUGGGCAUAUACAC (SEQ ID NO: 22) |
| hsa-miR-466 | AUACACAUACACGCAACACACAU (SEQ ID NO: 23) |
| hsa-miR-4738-3p | UGAAACUGGAGCGCCUGGAGGA (SEQ ID NO: 24) |
| hsa-mir-4753 | AUAUCUACACAAGGCCAAAGGAAGAGAACAGAUAUAUCCACA GUACACUUGGCUGUUCUCUUUCUUUAGCCUUGUGUAGAUAU (SEQ ID NO: 25) |
| hsa-miR-4783-5p | GGCGCGCCCAGCUCCCGGGCU (SEQ ID NO: 26) |
| hsa-miR-4791 | UGGAUAUGAUGACUGAAA (SEQ ID NO: 27) |
| hsa-miR-490-3p | CAACCUGGAGGACUCCAUGCUG (SEQ ID NO: 28) |
| hsa-miR-5010-3p | UUUUGUGUCUCCCAUUCCCCAG (SEQ ID NO: 29) |
| hsa-mir-5090 | UCUGAGGUACCCGGGGCAGAUUGGUGUAGGGUGCAAAGCCUG CCCGCCCCCUAAGCCUUCUGCCCCAACUCCAGCCUGUCAGGA (SEQ ID NO: 30) |
| hsa-miR-5094 | AAUCAGUGAAUGCCUUGAACCU (SEQ ID NO: 31) |
| hsa-miR-510-5p | UACUCAGGAGAGUGGCAAUCAC (SEQ ID NO: 32) |
| hsa-mir-532 | CGACUUGCUUUCUCUCCUCCAUGCCUUGAGUGUAGGACCGUU GGCAUCUUAAUUACCCUCCCACACCCAAGGCUUGCAGAAGAG CGAGCCU (SEQ ID NO: 33) |
| hsa-miR-548aj-3p | UAAAAACUGCAAUUACUUUUA (SEQ ID NO: 34) |
| hsa-miR-548u | CAAAGACUGCAAUUACUUUUGCG (SEQ ID NO: 35) |
| hsa-mir-601 | UGCAUGAGUUCGUCUUGGUCUAGGAUUGUUGGAGGAGUCAG AAAAACUACCCCAGGGAUCCUGAAGUCCUUUGGGUGGA (SEQ ID NO: 36) |
| hsa-mir-611 | AAAAUGGUGAGAGCGUUGAGGGGAGUUCCAGACGGAGAUGC GAGGACCCCUCGGGGUCUGACCCACA (SEQ ID NO: 37) |
| hsa-mir-6128 | AAGAAGCUUGUAGAUUUUUCUCCCUUACUAUCUAGAAUUAUA GGACUUCAGUCCAUGAUUUGGAAAAAUUACUGGAAUUGGAG UCAAAAAUAAUUUGAAAAUUAGGAAU (SEQ ID NO: 38) |
| hsa-miR-628-5p | AUGCUGACAUAUUUACUAGAGG (SEQ ID NO: 39) |
| hsa-miR-635 | ACUUGGGCACUGAAACAAUGUCC (SEQ ID NO: 40) |
| hsa-miR-636 | UGUGCUUGCUCGUCCCGCCCGCA (SEQ ID NO: 41) |
| hsa-miR-663a | AGGCGGGGCGCCGCGGGACCGC (SEQ ID NO: 42) |
| hsa-miR-6730-3p | CCUGACACCCCAUCUGCCCUCA (SEQ ID NO: 43) |
| hsa-miR-6768-5p | CACACAGGAAAAGCGGGGCCCUG (SEQ ID NO: 44) |
| hsa-miR-6865-3p | ACACCCUCUUUCCCUACCGCC (SEQ ID NO: 45) |

TABLE 1-continued

| microRNA/small RNA name | microRNA Sequence |
|---|---|
| hsa-miR-6894-5p | AGGAGGAUGGAGAGCUGGGCCAGA (SEQ ID NO: 46) |
| hsa-mir-762 | GGCCCGGCUCCGGGUCUCGGCCCGUACAGUCCGGCCGGCCAU GCUGGCGGGGCUGGGGCCGGGGCCGAGCCCGCGGCGGGGCC (SEQ ID NO: 47) |
| hsa-miR-8052 | CGGGACUGUAGAGGGCAUGAGC (SEQ ID NO: 48) |
| hsa-mir-8072 | GCGUCAAGAUGGCGGCGGGGAGGUAGGCAGAGCAGGACGCCG CUGCUGCCGCCGCCACCGCCGCCUCCGCUCCAGUCGCC (SEQ ID NO: 49) |
| hsa-miR-8075 | UGCUGAUGGCAGAUGUCGGGUCUG (SEQ ID NO: 50) |
| hsa-miR-92b-3p | UAUUGCACUCGUCCCGGCCUCC (SEQ ID NO: 51) |
| hsa-miR-937-5p | GUGAGUCAGGGUGGGCUGG (SEQ ID NO: 52) |
| cel-miR-39-3p | UCACCGGGUGUAAAUCAGCUUG (SEQ ID NO: 53) |
| scaRNA17 | AGAGGCUUGGGCCGCCGAGCUGGACCCGGACCGGUUUUGGGU ACUGUACUGGGGGCAGGGCAGAGAGGG (SEQ ID NO: 54) |
| U6 | GUGCUCGCUUCGGCAGCACAUAUACUAAAAUUGGAACGAUAC AGAGAAGAUUAGCAUGGCCCCUGCGCAAGGAUGACACGCAAA UUCGUGAAGCGUUCCAUAUUUU (SEQ ID NO: 55) |

Example 2: Verification of Human Mature miRNAs by qPCR in Sample Cohort of 8 Rapid and 8 Slow Progressing Patients The mean fold change for hsa-let7b-3p, hsa-miR-3613-3p and hsa-miR-6865-3p, hsa-pre-miR-532, and hsa-miR-663a, PrognomiRs between rapid and slow progressing PD patients are shown below in Table 2 and illustrated in FIG. 1.

TABLE 2

| PrognomiR | Fold change | Significance |
|---|---|---|
| hsa-let7b-3p | 0.17 | 0.02 |
| hsa-miR-3613-3p | 0.53 | 0.01 |
| hsa-miR-6865-3p | 0.44 | 0.002 |
| hsa-pre-miR-532 | 0.43 | 0.0005 |
| hsa-miR-663a | 0.46 | 0.01 |

Example 3

Measurement of levels of a combination of two or more miRNAs in serum from patients can assist in distinctly differentiating between a potential rapid as opposed to slow progressing PD patient. A serum sample is obtained from blood withdrawn from patients suspected of PD. The serum is used for total microRNA isolation and enrichment. This RNA would then be tested using qPCR to measure the levels of any two or more of the 52 miRNAs mentioned in Example 1, or any one of five miRNAs mentioned in Example 2. Detectable levels of one or more of the aforementioned 52 miRNAs with >1.2 fold change, or any one or more of these five miRNAs confirms the rate of progression for patients with PD. If desired, other sample fluids may be utilized, including plasma, venous or arterial blood, or CSF samples withdrawn by lumbar puncture. Such plasma, blood or CSF samples are processed as discussed above regarding serum, e.g., so as to provide a sample for processing and evaluation outside the human or animal body. It will be understood that measurement of more than two miRNAs in combination or a set of combinations used in a test matrix may desirably increase the accuracy of predicting PD progression. Following diagnosis, the result is then communicated to the patient.

As discussed and illustrated above, detecting the aforementioned miRNAs with >1.2 fold change may be used to differentiate potential rapid progressing PD from potential slow progressing PD in afflicted patients. However, as readily understood by those of ordinary skill herein, other thresholds may be suitably employed as desired with possible concomitant variation in accuracy, including >1.0, 1.1, 1.3, 1.4, 1.5, 1.6, 1.7, 1.8, 1.9, and 2.0 fold changes. Moreover, it will be similarly understood that these varying fold change thresholds may be more suitably used with particular miRNAs without affecting accuracy.

Example 4

Since a combination of miRNA can be used for predicting prognosis it may be advisable to test all the candidates to eliminate any cohort-based variation. It is understood that any detectable amounts of relevant miRNA will indicate PD pathology. However, those of ordinary skill in the art recognize it may be clinically helpful to use values of slow (8) v rapid (8) samples to set an artificial threshold for determination of rate of disease progression. Differential miRNA levels can be used to develop prognostic biomarker kits that can be used by clinicians for estimating prognosis of the disease as well as enriching patient cohorts in clinical trials. In this study the presence and quantification of miRNA from serum was determined by qRT-PCR which amplifies and quantifies the RNA is question. Other suitable techniques known to those of ordinary skill herein may be alternatively utilized, including use of labeled antisense sequences and labeled antibodies. Suitable antibodies are preferentially selective, referring to a binding reaction between two molecules that is typically more than 10 to 100 times background molecular associations under measurement conditions. Thus, under designated immunoassay conditions, the specified antibodies bind to a particular miRNA sequence, thereby identifying its presence. Specific binding to an antibody under such conditions requires an antibody that is selected for its specificity for a particular miRNA. For example, antibodies raised against a particular miRNA can be selected by subtracting out antibodies that cross-react with other molecules. A variety of immunoassay formats may be used to select antibodies specifically immunoreactive with a particular miRNA including solid-phase ELISA immunoassays (see, e.g., Harlow & Lane, Antibodies, A Laboratory Manual (1988) for a description of immunoassay formats and conditions that can be used to determine specific immunoreactivity). Methods for determining whether two molecules specifically interact are disclosed therein, and methods of determining binding affinity and specificity are well known in the art (see, for example, Harlow and Lane, Antibodies: A laboratory manual (Cold Spring Harbor Laboratory Press, 1988); Friefelder, "Physical Biochemistry: Applications to biochemistry and molecular biology" (W.H. Freeman and Co. 1976)). The term "antibody" as used herein encompasses naturally occurring antibodies as well as non-naturally occurring antibodies, including, for example, single chain antibodies, chimeric, bifunctional and humanized antibodies, as well as antigen-binding fragments thereof, (e.g., Fab', F(ab')2, Fab, Fv and rIgG). See also, Pierce Catalog and Handbook, 1994-1995 (Pierce Chemical Co., Rockford, IL). See also, e.g., Kuby, J., Immunology, 3rd Ed., W.H. Freeman & Co., New York (1998). Such non-naturally occurring antibodies can be constructed using solid phase peptide synthesis, can be produced recombinantly or can be obtained, for example, by screening combinatorial libraries consisting of variable heavy chains and variable light chains as described by Huse et al., Science, Vol. 246 (1989) 1275-81. These and other methods of making, for example, chimeric, humanized, CDR-grafted, single chain, and bifunctional antibodies are well known to those skilled in the art (Winter and Harris, Immunol. Today, Vol. 14 (1993) 243-46; Ward et al., Nature, Vol. 341 (1989) 544-46; Harlow and Lane, supra, 1988; Hilyard et al., Protein Engineering: A practical approach (IRL Press 1992); Borrabeck, Antibody Engineering, 2d ed. (Oxford University Press 1995). Methods for producing both monoclonal and polyclonal antibodies from identified RNA sequences are well known in the art.

Example 5

Many neurodegenerative diseases are closely related to each other when it comes to symptoms as well as pathological markers. The circulating prognostic markers for one neurodegenerative disease can be useful for diagnosis/prognosis of other disease. A method to diagnose/prognoses other neurodegenerative diseases like Dementia with Lewy body (DLB), Amyotrophic lateral sclerosis (ALS), Alzheimer's disease (AD), Multiple system atrophy (MSA), CorticoBasal Degeneration (CBD), Progressive Supranuclear Palsy (PSP) can also be developed using similar miRNA measurements of candidates mentioned above. Disease specific kits can be developed similar to one mentioned in above with various combinations of miRNAs listed.

Example 6

The miRNAs detected in one or more combinations can regulate several proteins in the cells. Novel protein targets for PD can be discovered using these microRNAs and their combinations. The involvement of these proteins in PD etiology can be further established to target them for therapy.

Example 7

Small nucleic acid molecules derived from miRNAs mentioned above will be designed to therapeutically intervene by specifically targeting genes in PD brains to achieve complete or partial remedy.

What is claimed is:

1. A method for treating a human patient with rapid progressing Parkinson's disease, comprising the steps of, in this order:
   obtaining a first sample comprising serum, plasma or blood from said patient;
   determining a level of expression of at least one miRNA selected from the group consisting of SEQ ID NOS: 33, 42 and 45, and optionally further determining a level of expression of at least one miRNA selected from the group consisting of SEQ ID NOS: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 34, 35, 36, 37, 38, 39, 40, 41, 43, 44, 46, 47, 48, 49, 50, 51 and 52 within said first sample;
   comparing the level of expression of the determined SEQ ID NOS to a level of expression of the determined SEQ ID NOS in a second sample from a cohort with slow progressing Parkinson's disease and confirming the expression level of the determined SEQ ID NOS in said first sample is greater than 1.2-fold over that of said second sample, thereby indicating the patient has rapid progressing Parkinson's disease; and
   treating said rapid progressing Parkinson's disease with at least one of L-dopa, a dopamine agonist, a catechol-O-methyltransferase (COMT) inhibitor, amantidine (1-Aminotricyclo (3,3,1,1$^{3,7}$) decane or a monoamino oxidase type B inhibitor.

2. The method according to claim 1, wherein expression of miRNAs according to at least SEQ ID NO: 33 is compared relative to the cohort.

3. The method according to claim 1, wherein expression of miRNAs according to at least SEQ ID NO: 42 is compared relative to the cohort.

4. The method according to claim 1, wherein expression of miRNAs according to at least SEQ ID NO: 45 is compared relative to the cohort.

5. The method according to claim 1, wherein expression of miRNAs according to at least two of said SEQ ID NOS: 33, 42 and 45 is compared relative to the cohort.

6. The method according to claim 5, wherein expression of miRNAs according to at least SEQ ID NOS: 33 and 42 is compared relative to the cohort.

7. The method according to claim 5, wherein expression of miRNAs according to at least SEQ ID NOS: 33 and 45 is compared relative to the cohort.

8. The method according to claim 5, wherein expression of miRNAs according to at least SEQ ID NOS: 42 and 45 is compared relative to the cohort.

9. The method according to claim 1, wherein expression of miRNAs according to each of said SEQ ID NOS: 33, 42 and 45 is compared relative to the cohort.

10. The method according to claim 1, wherein said first sample comprises serum.

* * * * *

UNITED STATES PATENT AND TRADEMARK OFFICE
CERTIFICATE OF CORRECTION

PATENT NO. : 12,448,653 B2
APPLICATION NO. : 18/452778
DATED : October 21, 2025
INVENTOR(S) : Moller et al.

It is certified that error appears in the above-identified patent and that said Letters Patent is hereby corrected as shown below:

In the Specification

Column 1:
Line 32, "10 million people world-wide" should read --10 million people worldwide--

Column 2:
Line 22, "Amantidine (1-Aminotricyclo (3,3,1,13•7) decane)" should read --Amantadine (1-Aminotricyclo (3,3,1,13•7) decane)--
Line 26, "Patients who receive amantidine" should read --Patients who receive amantadine--
Line 31, "of the monoamino oxidase" should read --of the monoamine oxidase--
Line 51, "MicroRNAs ("miRNAs) are a" should read --MicroRNAs (miRNAs) are a--

Column 3:
Line 29, "powerful candidates to be" should read --powerful candidates for--
Line 40, "treatment option based on" should read --treatment options based on--
Lines 65-66, "Between November 1st 2004 and 31st of August 2006 it" should read --Between November 1, 2004, and August 31, 2006, it--
Line 67, "Parkinson Disease within the" should read --Parkinson's Disease within the--

Column 4:
Line 1, "the study 212 of" should read --the study, 212 of--
Line 10, "parkinsonism at study entry" should read --Parkinsonism at study entry--
Line 21, "PD that were eligible" should read --PD who were eligible--
Line 23, "at the same day" should read --on the same day--
Line 62, "miRNA specific qPCR was" should read --miRNA-specific qPCR was--
Line 65, "using miRNA specific forward" should read --using miRNA-specific forward--

Signed and Sealed this
Twenty-fifth Day of November, 2025

John A. Squires
*Director of the United States Patent and Trademark Office*

Column 9:
Lines 53-54, "slow progressing PD patient" should read --slow-progressing PD patient--
Line 62, "five miRNAs confirms the" should read --five miRNAs confirm the--

Column 10:
Line 37, "potential rapid progressing PD" should read --potential rapidly progressing PD--
Line 49, "combination of miRNA can" should read --combination of miRNAs can--
Line 62, "the RNA is question" should read --the RNA in question--

Column 11:
Line 25, "single chain antibodies, chimeric" should read --single-chain antibodies, chimeric--
Line 37, "humanized, CDR-grafted, single chain" should read --humanized, CDR-grafted, single-chain--

Column 12:
Line 15, "other disease. A method" should read --other diseases. A method--
Line 22, "to one mentioned in above" should read --to one mentioned above--

In the Claims

Column 23:
Line 33, "human patient with rapid" should read --human patient with rapidly--
Lines 34-35, "the steps of, in this order" should read --of the steps in this order--
Line 53, "the patient has rapid" should read --the patient has rapidly--
Line 55, "treating said rapid progressing" should read --treating said rapidly progressing--